US009196282B2

(12) United States Patent
Sato

(10) Patent No.: US 9,196,282 B2
(45) Date of Patent: Nov. 24, 2015

(54) MAGNETIC RECORDING MEDIUM

(75) Inventor: Narumi Sato, Matsumoto (JP)

(73) Assignee: FUJI ELECTRIC CO., LTD. (JP)

(*) Notice: Subject to any disclaimer, the term of this patent is extended or adjusted under 35 U.S.C. 154(b) by 199 days.

(21) Appl. No.: 13/569,553

(22) Filed: Aug. 8, 2012

(65) Prior Publication Data

US 2013/0040168 A1 Feb. 14, 2013

(30) Foreign Application Priority Data

Aug. 9, 2011 (JP) .................................. 2011-173869

(51) Int. Cl.
G11B 5/66 (2006.01)
G11B 5/72 (2006.01)
G11B 5/84 (2006.01)

(52) U.S. Cl.
CPC ................ *G11B 5/72* (2013.01); *G11B 5/8408* (2013.01)

(58) Field of Classification Search
None
See application file for complete search history.

(56) References Cited

U.S. PATENT DOCUMENTS

| 2001/0004499 A1* | 6/2001 | Horng et al. ............ 428/694 TC |
| 2001/0029051 A1 | 10/2001 | Hyodo et al. |
| 2006/0029806 A1* | 2/2006 | Hyodo et al. ............ 428/408 |
| 2008/0310050 A1* | 12/2008 | Osawa et al. ............ 360/110 |
| 2010/0167090 A1 | 7/2010 | Nagata et al. |

FOREIGN PATENT DOCUMENTS

| JP | 61-222024 A | 10/1986 |
| JP | 08106631 A | 4/1996 |
| JP | 08-167138 A | 6/1996 |
| JP | 09-237415 A | 9/1997 |
| JP | 2002032907 A | 1/2002 |
| JP | 2002312923 A | 10/2002 |
| JP | 2010146683 A | 7/2010 |

OTHER PUBLICATIONS

Storage Research Consortium, "Perpendicular Magnetic Recording Technology Achieving a Recording Density of 1 Terabytes Per 1 Square Inch", May 27, 2008.
Robertson, John, "The Deposition Mechanism of Diamond-like a-C and a-C:H", National Power Laboratories, Swindon, Wilts SN5 6PE (UK), 1994.
Japanese Office Action cited in Japanese counterpart application No. JP2011-173869, dated Mar. 3, 2015. English translation provided.

* cited by examiner

*Primary Examiner* — Holly Rickman
(74) *Attorney, Agent, or Firm* — Rossi, Kimms & McDowell LLP

(57) ABSTRACT

A magnetic recording medium is disclosed which has excellent corrosion resistance, even with a protective layer of thickness 2 nm or less. The magnetic recording medium includes, on a substrate, a magnetic layer and a carbon-based protective layer. The thickness of the carbon-based protective layer is 2 nm or less, and the contact angle of water on a surface of the carbon-based protective layer is 25° or greater and less than 60°.

11 Claims, 10 Drawing Sheets

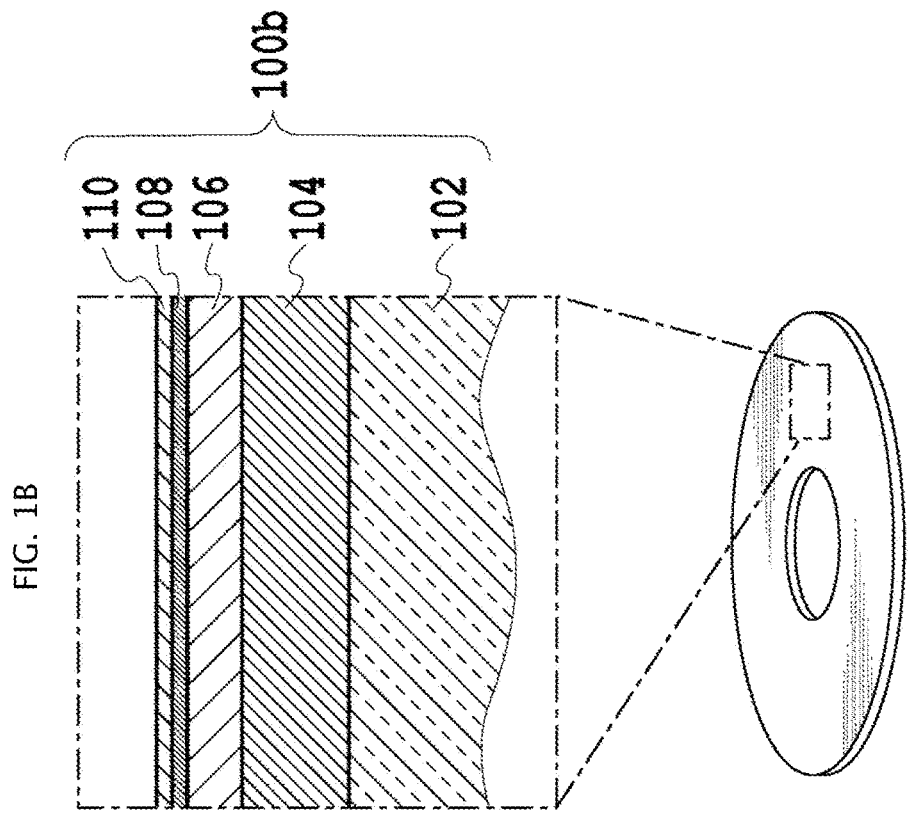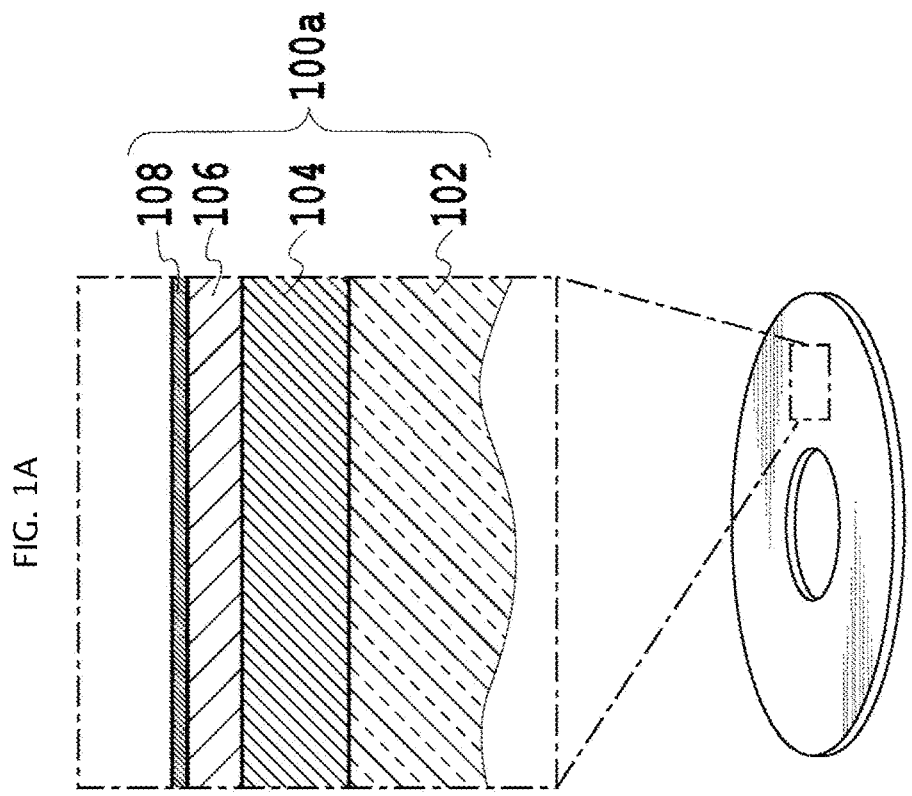

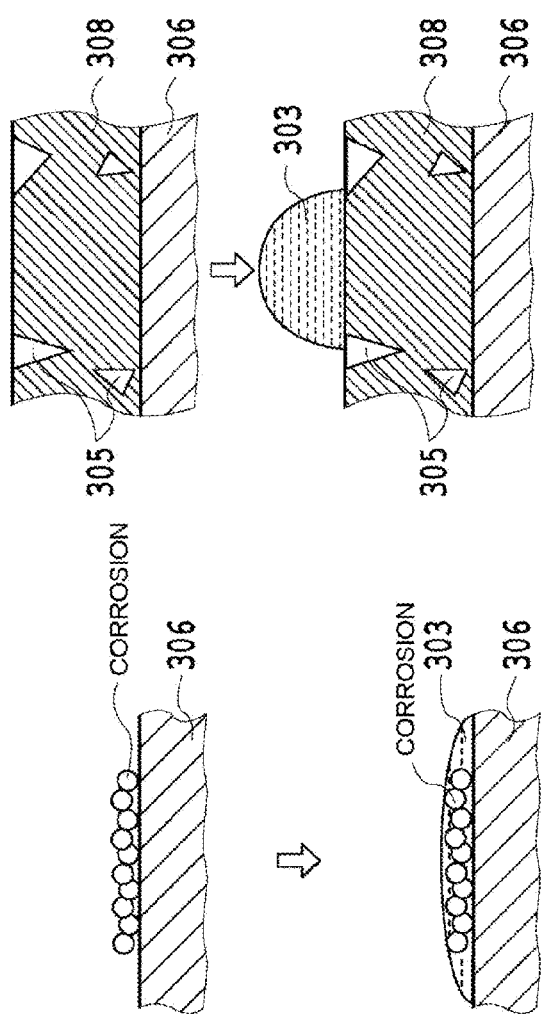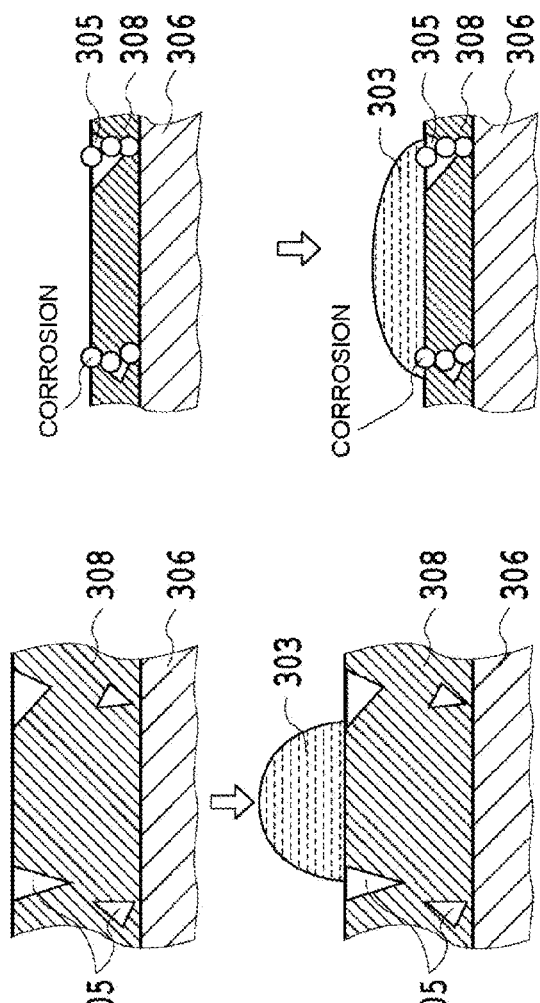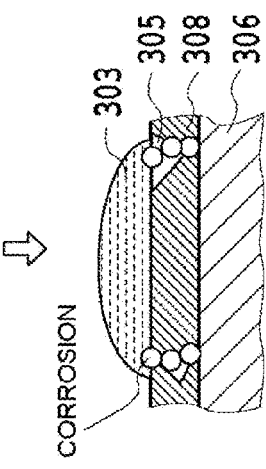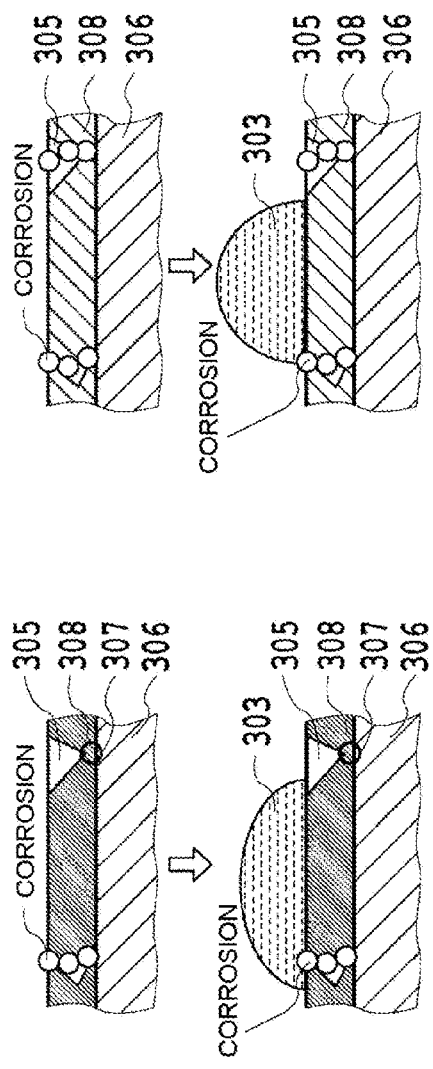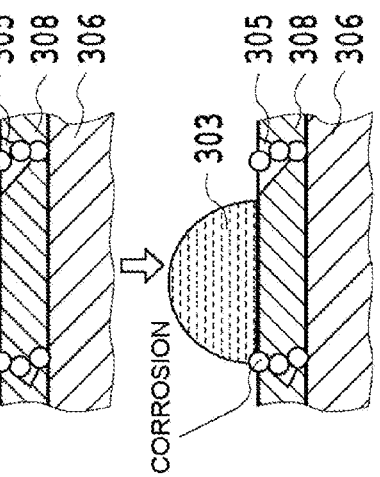

MAGNETIC RECORDING MEDIUM

This application is based on and claims priority to Japanese Patent Application 2011-173869, filed on Aug. 9, 2011. The disclosure of the priority application in its entirety, including the drawings, claims, and the specification thereof, is incorporated herein by reference.

BACKGROUND OF THE INVENTION

A. Field of the Invention

This invention relates to a magnetic recording medium, and in particular relates to a magnetic recording medium used in a hard disk drive and similar.

B. Description of the Related Art

The recording capacities of hard disk drives have risen steadily, and the recording densities of magnetic recording media mounted in such drives have also continued to rise without interruption. When raising recording densities, the horizontal magnetic recording method has been adopted in the prior art, but the problem of thermal fluctuations has become a large impediment. Hence, in recent years a new recording method which resolves the problem of thermal fluctuations, that is, the perpendicular magnetic recording method, has been adopted, and media employing this method have been commercialized.

Even so, there has been no break in the momentum toward higher recording densities of magnetic recording media, and recording densities are continuing to rise at a pace of approximately 50% per year. This rise is accomplished not only through a change in recording method as described above, but through unflagging progress in all engineering fields. For example, where HDI (Head-Disk Interface) technology is concerned, head flying heights have been reduced year after year, and the distance between the head and the magnetic layer of the magnetic recording medium (the magnetic spacing) has gradually grown smaller. In order to reduce the magnetic spacing, there have been unceasing efforts to reduce the thickness of the protective layer formed on the magnetic layer.

At present the thickness of protective layers has already been reduced to from 2 to 3 nm, but further reduction of the protective layer thickness is sought. For example, in the briefing paper of the 25$^{th}$ SRC Technology Session (May 27, 2008), guidelines for the design of hard disk drives of the next generation products are described, and a recording density of 1 Tb/in$^2$ and magnetic spacing of 6.5 nm are proposed. Considering the breakdown of the magnetic spacing, the magnetic head protective layer thickness is approximately 2 nm, the gap between the uppermost face of the magnetic head and the surface of the magnetic recording medium (the head flying height) is approximately 2 nm, and the lubrication layer of the magnetic recording medium is approximately 0.5 nm to 1 nm, and so the thickness of the protective layer of the magnetic recording medium must be 2 nm or less.

On the other hand, the protective layer, as its name implies, serves to protect the magnetic layer made of a metal material so that is does not react with water in the atmosphere or corrosive gas and corrode. Magnetic recording media having protective layers provided with corrosion resistance and other characteristics are, for example, disclosed in Japanese Patent Application Laid-open No. S61-222024, Japanese Patent Application Laid-open No. H8-167138 and Japanese Patent Application Laid-open No. H9-237415.

In Japanese Patent Application Laid-open No. S61-222024, Japanese Patent Application Laid-open No. H8-167138 and Japanese Patent Application Laid-open No. H9-237415, attempts are made to improve the quality of magnetic recording media by focusing on the contact angle of water dripped onto the surface of the protective layer, setting the contact angle within a prescribed range. It is proposed that the contact angle be set to 75° or greater, to 60° or greater, and to 80° or greater in Japanese Patent Application Laid-open No. S61-222024, Japanese Patent Application Laid-open No. H8-167138 and Japanese Patent Application Laid-open No. H9-237415, respectively.

However, in all of Japanese Patent Application Laid-open No. S61-222024, Japanese Patent Application Laid-open No. H8-167138 and Japanese Patent Application Laid-open No. H9-237415 the thickness of the protective layer is 10 nm or greater, and demands for reduced thickness of the protective layer are not adequately addressed.

On the other hand, if the protective layer is made thinner, coverage of the magnetic layer is reduced, and hence there is a tendency for the corrosion resistance of the magnetic recording medium to be degraded.

The present invention is directed to overcoming or at least reducing the effects of one or more of the problems set forth above.

SUMMARY OF THE INVENTION

The present invention provides a magnetic recording medium having high corrosion resistance, while keeping the thickness of the protective layer at 2 nm or less.

This invention relates to a magnetic recording medium comprising, on a substrate, a magnetic layer and a carbon-based protective layer, and is characterized in that a thickness of the carbon-based protective layer is 2 nm or less, and that a contact angle of water on a surface of the carbon-based protective layer is 25° or greater and less than 60°.

It is preferable that in a magnetic recording medium of this invention, the carbon-based protective layer contain diamond-like carbon.

It is preferable that in a magnetic recording medium of this invention, the carbon-based protective layer is formed by a plasma CVD method. Further, in a plasma CVD method, it is preferable that the plasma density be $10^{10}$ cm$^{-3}$ or higher.

It is preferable that the magnetic recording medium of this invention be a perpendicular magnetic recording-type magnetic recording medium.

A magnetic recording medium of this invention has excellent corrosion resistance, while keeping the thickness of the protective layer at 2 nm or less. Hence it is possible to provide a magnetic recording medium capable of accommodating high-density recording at a recording density of 1 Tb/in$^2$ or higher. Consequently, its application to various devices requiring high recording densities, and in particular high recording densities of 1 Tb/in$^2$ or higher, is possible.

BRIEF DESCRIPTION OF THE DRAWINGS

The foregoing advantages and features of the invention will become apparent upon reference to the following detailed description and the accompanying drawings, of which:

FIGS. 1A and 1B are schematic diagrams showing two examples of magnetic recording media of this invention;

FIGS. 3A to 3E summarize changes in the contact angle of water on the layer surface, when water is dripped onto the surface of the magnetic layer or the carbon-based protective layer of a magnetic recording medium;

DETAILED DESCRIPTION OF SPECIFIC EMBODIMENTS

Figure 2:
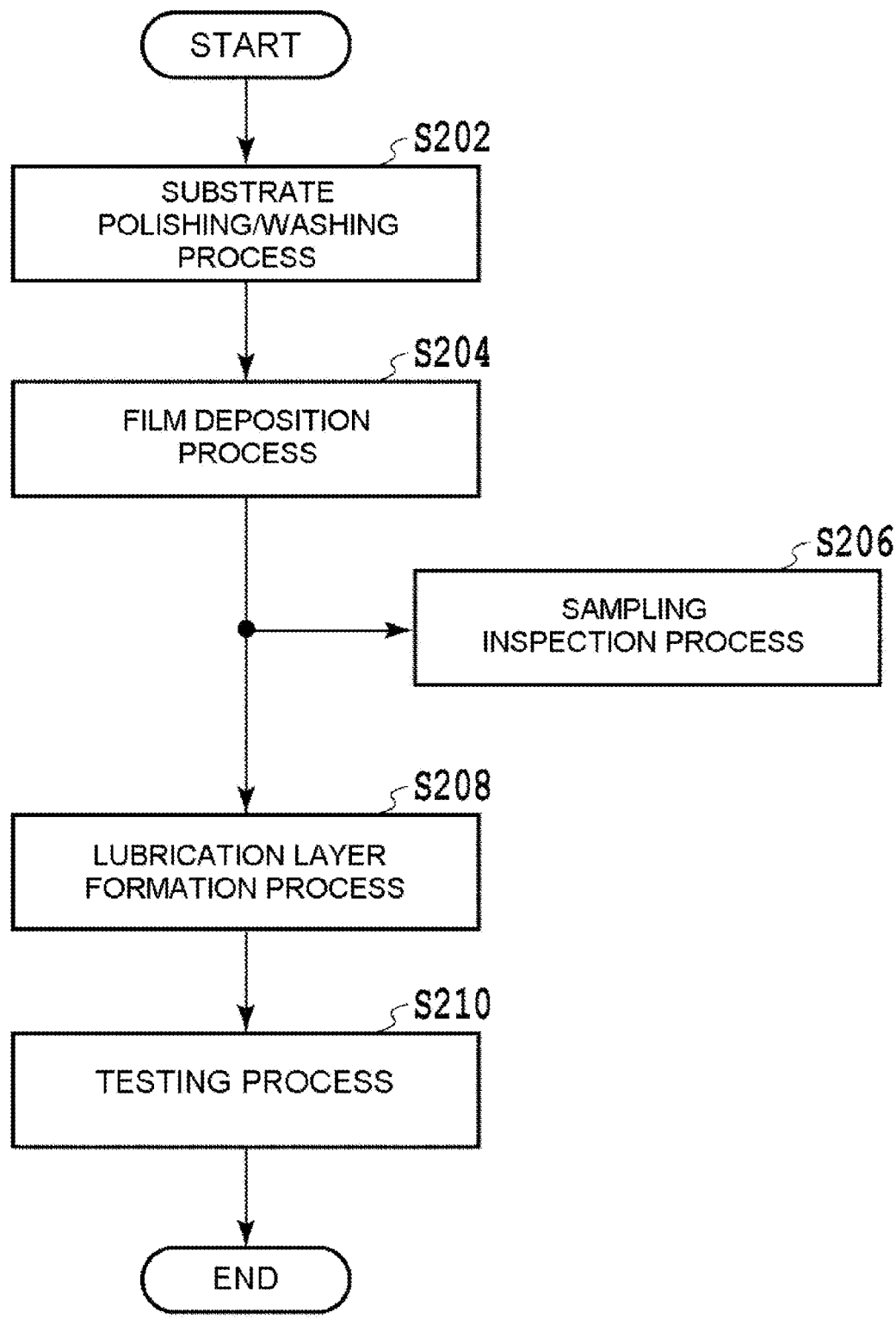
FIG. 2 is a flowchart showing an example of a method of manufacture of a magnetic recording medium of this invention.

A magnetic recording medium of this invention comprises, on a substrate, a magnetic layer and a carbon-based protective layer, and is characterized in that the thickness of the carbon-based protective layer is 2 nm or less. Moreover, the contact angle of water on the surface of the carbon-based protective layer is 25° or greater and less than 60°.

Below, magnetic recording media of this invention are explained in detail with reference to the drawings. The aspects described below are examples of the invention, and various appropriate design modifications by a person skilled in the art are possible.

FIG. 1 is a schematic diagram showing two examples of magnetic recording media of this invention. FIG. 1A shows magnetic recording medium 100a in which are formed in order, on substrate 102, soft magnetic layer 104 of an optional element, an intermediate layer (not shown) of an optional element, magnetic layer 106, and carbon-based protective layer 108. FIG. 1B shows magnetic recording medium 100b in which, in the example shown in FIG. 1A, lubrication layer 110 is further formed on carbon-based protective layer 108.

No particular imitations are placed on substrate 102 so long as any substrate used in magnetic recording media of the prior art is used. For example, substrates made of glass, aluminum, ceramics, plastics, and other materials may be used.

In magnetic recording medium 100 of this invention, a layer used in magnetic recording media of the prior art can be further provided as necessary between substrate 102 and magnetic layer 106. For example, soft magnetic layer 104 and intermediate layer (not shown) can be provided in order to improve the performance of the magnetic layer.

Soft magnetic layer 104 which optionally may be provided can be formed using crystalline materials such as FeTaC, Sendust (FeSiAl) or other alloys; microcrystalline materials such as FeTaC, CoFeNi, CoNiP and similar; and amorphous alloys including CoZrNd, CoZrNb, CoTaZr, or other Co alloys.

The optimal value of the thickness of soft magnetic layer 104 changes depending on the structure and characteristics of the magnetic head used in recording, but from considerations of productivity it is preferable that the thickness be between approximately 20 nm and 300 nm.

An intermediate layer which optionally can be provided can be formed using a nonmagnetic material, such as for example Ru or a CoCr alloy containing Ru.

The optimal value of the thickness of an intermediate layer changes depending on the structure and characteristics of the magnetic head used in recording, but from considerations of productivity it is preferable that the thickness be between approximately 1 nm and 50 nm.

No limitations in particular are imposed on magnetic layer 106, so long as a metal material used in magnetic recording media of the prior art is used. For example, CoPt, CoCrPt, CoCrPtB, CoCrPtTa, and other CoCr alloys or CoPt alloys can be used.

Further, magnetic layer 106 may be formed using a material having a granular structure, in which magnetic crystalline grains are dispersed in a matrix of a nonmagnetic oxide or a nonmagnetic nitride. Materials having a granular structure which can be used include, but are not limited to, CoPt—$SiO_2$, CoCrPtO, CoCrPt—$TiO_2$, CoCrPt—$SiO_2$, CoCrPt—$Al_2O_3$, CoPt—AlN, and CoCrPt—$Si_3N_4$. When using a material having a granular structure, it is possible to promote magnetic separation between magnetic crystalline grains in proximity in magnetic layer 106, so as to reduce noise, improve the SNR, enhance recording resolution, and otherwise improve magnetic recording characteristics. Hence, when manufacturing a perpendicular magnetic recording-type magnetic recording medium requiring magnetic separation between magnetic crystalline grains in proximity in magnetic layer 106, magnetic layer 106 can be formed using a material having a granular structure.

No limitations in particular are imposed on the thickness of magnetic layer 106. For example, from the standpoints of productivity and improvement of recording density, the thickness of magnetic layer 106 can be set in the range 5 nm to 50 nm.

Carbon-based protective layer 108 is formed using a carbon material. As the morphology of the carbon formed, in order to form carbon-based protective layer 108 which is highly close-packed in particular, it is preferable that the material be diamond-like carbon.

Here, carbon-based protective layer 108 which is highly close-packed means a protective layer in which the $sp^3$ ratio of the carbon forming the layer is high. The $sp^3$ ratio is the ratio of bonds between carbon atoms which are single bonds.

Various materials other than carbon materials which are known as materials for the protective layers of magnetic recording media can also be used in carbon-based protective layer 108.

The thickness of carbon-based protective layer 108 is 2 nm or less due to demands for reduced magnetic spacing accompanying higher recording densities. Here, the thickness of carbon-based protective layers 108 can be measured using a transmission electron microscope (manufactured by Hitachi High-Technologies Corp.).

The contact angle of water on the surface of carbon-based protective layer 108 is 25° or greater and less than 60°, in order to attain high corrosion resistance for the magnetic recording medium.

In magnetic recording medium 100 of this invention, a layer used in magnetic recording media of the prior art can be further provided as necessary on carbon-based protective layer 108. For example, as shown in FIG. 1B, lubrication layer 110 to reduce the friction force occurring between carbon-based protective layer 108 and the head (not shown) can be provided on carbon-based protective layer 108.

Material normally used in magnetic recording media can be used as the material of lubrication layer 110. Examples are perfluoropolyether and other fluorine-based lubricants. Lubrication layer 110 formed from a fluorine-based lubricant has excellent hydrophobic properties, and so the corrosion resistance of the magnetic recording medium can be further enhanced.

It is preferable that the thickness of lubrication layer 110 be from 0.5 nm to 1 nm, in consideration of requirements for a reduced magnetic spacing accompanying higher recording densities. Here the thickness of lubrication layer 110 can be measured using a Fourier transform-type infrared spectrophotometer (manufactured by Thermo Fisher Scientific K.K.).

In the above, magnetic recording medium 100 of this invention was explained with reference to FIG. 1. The layers of magnetic recording medium 100 of this invention may be stacked on both sides sandwiching substrate 102, formed such that both surfaces of the medium have magnetic recording faces with equivalent magnetic recording performance.

A magnetic recording medium of this invention has high corrosion resistance, even while making the thickness of the protective layer 2 nm or less. This is in order to accommodate next-generation products requiring a high recording density of 1 Tb/in$^2$. For example, such media can be widely used as perpendicular magnetic recording media mounted in perpendicular magnetic recording-type hard disk drives and similar.

Next, a method of manufacture of a magnetic recording medium of this invention is explained in detail, referring to the drawings.

FIG. 2 is a flowchart showing an example of a method of manufacture of a magnetic recording medium of this invention. From the figure, a magnetic recording medium of this invention can be fabricated by a substrate polishing and washing process (step S202) and film deposition process (step S204). Thereafter, a lubrication layer formation process (step S208) and testing process (step S210) may be performed as necessary. Further, a sampling inspection process (step S206) may be performed as desired.

The substrate polishing and washing process (step S202) of FIG. 2 is a process of polishing and washing substrate 102 shown in FIG. 1. Methods used in the manufacture of magnetic recording media of the prior art can be applied. For example, after using an abrasive in flat polishing of substrate 102 until an appropriate surface roughness is reached, the abrasive and polishing residue may be completely washed from the polished substrate 102. Washing can be performed by an ultrasonic method, a scrubbing method using a brush, a high-pressure water jetting method, a method of immersion in an alkali cleaner, and similar methods. After cleaning using one of these methods, ultraviolet ray irradiation can be further performed.

Step S204 in FIG. 2 is a film deposition process. Specifically, magnetic layer 106 and carbon-based protective layer 108 are formed in order on substrate 102 as shown in FIG. 1. Prior to forming magnetic layer 106, layers used in magnetic recording media of the prior art, such as, for example, soft magnetic layer 104 and intermediate layer (not shown), may further be formed on substrate 102.

Formation of an optional soft magnetic layer 104 can be performed using a sputtering method (including a DC magnetron sputtering method, RF magnetron sputtering method, and similar), vacuum evaporation deposition method, or any other well-known method in this technical field.

Formation of an optional intermediate layer (not shown) can be performed using a sputtering method (including a DC magnetron sputtering method, RF magnetron sputtering method, and similar), vacuum evaporation deposition method, or any other well-known method in this technical field.

Formation of magnetic layer 106 can be performed using a sputtering method (including a DC magnetron sputtering method, RF magnetron sputtering method, and similar), vacuum evaporation deposition method, or any other well-known method in this technical field.

The conditions for formation of soft magnetic layer 104, an intermediate layer (not shown), and magnetic layer 106 differ depending on the materials used, but conditions disclosed for methods of manufacturing of magnetic recording media of the prior art may be applied.

Carbon-based protective layer 108 can be obtained by formation of diamond-like carbon from a hydrocarbon gas or other material by a CVD (Chemical Vapor Deposition) method. In particular, it is preferable that a plasma CVD method, which can form a harder and more close-packed thin film, be used. A plasma CVD method is a method in which energy is imparted to a raw material gas to form a plasma state, and active ions and/or radicals are generated to cause a chemical reaction and form a layer.

When using a hydrocarbon gas as the raw material gas, by optimizing the energy of the carbon ions generated, the sp$^3$ ratio of the carbon in the layer can be raised (see, for example, J. Robertson, Diamond and Related Materials, 3 (1994), 361-368).

As the hydrocarbon gas, methane, ethylene, acetylene, toluene or similar can be used, for example.

Carbon-based protective layer 108 can be formed by appropriately adjusting the flow rate of the hydrocarbon gas, bias voltage applied to the substrate, RF discharge output, and other parameters in the plasma CVD apparatus.

It is preferable that the gas flow rate be between 10 sccm and 40 sccm. When greater than 40 sccm, the pressure during the process is high, and the mean free path of carbon ions is shortened. Consequently the ion energy falls, and carbon-based protective layer 108 becomes a film with a low sp$^3$ ratio and is loosely packed. When the rate is lower than 10 sccm, the energy of carbon ions becomes too great, the optimum sp$^3$ ratio is not obtained, and the film is loosely packed.

It is preferable that the carbon ion energy be between 15 eV and 150 eV in order to obtain the desired carbon sp$^3$ ratio in the layer.

The bias voltage applied to the substrate and the RF discharge output can be adjusted appropriately so that the carbon ion energy assumes a desired value. For example, when the carbon ion energy is low, the bias voltage can be raised to increase the carbon ion energy.

The thickness of carbon-based protective layer 108 can be set to 2 nm or less that is a desired thickness, by appropriately adjusting the gas flow rate, the film deposition time or the like.

Plasma CVD methods can be classified based on the method of plasma generation and the density of the plasma generated into a CCP (Capacitively Coupled Plasma) method, a thermal filament method, an ECR (Electron Cyclotron Resonance) method, an ICP (Inductively Coupled Plasma) method, and an MEICP (Magnetically Enhanced Inductively Coupled Plasma) method which adds a DC magnetic field to the ICP method, and similar.

The plasma densities for these methods are known to be approximately $10^{11}$ cm$^{-3}$ for the CCP method, approximately $10^{10}$ cm$^{-3}$ to $10^{11}$ cm$^{-3}$ for the thermal filament method, approximately $10^{11}$ cm$^{-3}$ to $10^{12}$ cm$^{-3}$ for the ECR and ICP methods, and approximately $10^{12}$ cm$^{-3}$ or higher for the MEICP method.

In this invention, it is preferable that the plasma density be $10^{10}$ cm$^{-3}$ or higher. By making the plasma density $10^{10}$ cm$^{-3}$ or higher, the carbon sp$^3$ ratio can be raised, and carbon-based protective layer 108 which is highly close-packed can be formed.

The sampling inspection process of FIG. 2 (step S206) is a process in which magnetic recording media 100a, indicated in FIG. 1A and fabricated in steps S202 and S204, is sampled and inspected as desired. The inspection process (step S206) includes inspections to confirm that the contact angle of water on the surface of carbon-based protective layer 108 is 25° or greater and less than 60°, and inspections as to whether corrosion resistance of magnetic recording medium 100a satisfies a passing criterion.

Measurement of the contact angle can be performed by the liquid drop method (θ/2 method) using a contact angle meter. First magnetic recording medium 100a is mounted horizontally within the contact angle meter such that carbon-based protective layer 108 is uppermost, and water is dripped onto the surface of carbon-based protective layer 108. Next, the water drop is observed with a microscope, and the angle $\theta_1$ made by the straight line connecting the right or left edge and the apex of the water drop with the surface of carbon-based protective layer 108 is read off; the value obtained by doubling $\theta_1$ is taken to be the contact angle. Next, the measured contact angle is confirmed to be 25° or greater and less than 60°.

Corrosion resistance inspections of magnetic recording media 100a can be performed as follows.

First, a prescribed amount of an acid solution is dripped onto the surface of carbon-based protective layer 108 of magnetic recording medium 100a placed horizontally, and after leaving for a prescribed length of time, all of the acid solution is recovered. The place at which the acid solution is dripped is different from the place at which water is dripped for measurement of the contact angle. Next, the recovered acid solution is subjected to ICP-MS (Inductively Coupled Plasma Mass Spectrometry) to measure the amount of metal eluted from magnetic layer 106 through carbon-based protective layer 108. Then, this metal amount is divided by the area of carbon-based protective layer 108 covered by the dripped acid solution, to calculate the amount of metal per unit area. If this calculated value is smaller than a prescribed criterion, the corrosion resistance of magnetic recording medium 100a is taken to be adequate.

As the acid used in test, an acid which elutes the metal included in magnetic layer 106 can be used. For example, when the metal is Co, nitric acid can be used.

The lubrication layer formation process of FIG. 2 (step S208) is a process of forming lubrication layer 110 on carbon-based protective layer 108 as shown in FIG. 1B.

Lubrication layer 110 can be formed using a dipping method or an arbitrary application method such as spin-coating or similar known in this technical field. After application, heat treatment may be performed. Heat treatment strengthens the bonding force between lubrication layer 110 and carbon-based protective layer 108, and has the effect of preventing layer separation of lubrication layer 110.

The conditions for formation of lubrication layer 110 differ depending on the material used, but conditions disclosed for methods of manufacture of magnetic recording media of the prior art may be applied.

The testing process of FIG. 2 (step S210) is a process in which magnetic recording medium 100b shown in FIG. 1B is subjected mainly to two types of tests, which are a gliding test and a read/write test.

The gliding test is a test to inspect the smoothness of the magnetic recording surface of magnetic recording medium 100b. The read/write test is a test in which a specific pattern is written to the magnetic recording surface of magnetic recording medium 100b, and then readout tests are performed to determine whether there are pulse omissions or output level anomalies.

As the methods of the gliding test and read/write test, methods disclosed for magnetic recording media of the prior art may be applied.

Through the above-described processes, a magnetic recording medium of this invention can be fabricated.

A magnetic recording medium of this invention, by keeping the thickness of the carbon-based protective layer at 2 nm or less and making the contact angle of a drop of water on the carbon-based protective layer surface 25° or greater and less than 60°, exhibits excellent corrosion resistance. The inventor focused on the contact angle, reasoning that the contact angle is a suitable index for an overall evaluation of the coverage and the degree of close-packing of the carbon-based protective layer, as elements determining the corrosion resistance of the magnetic recording medium. Below, the relation between the carbon-based protective layer thickness and the degree of close-packing, which have a strong influence on the coverage of the carbon-based protective layer, to the contact angle of water on the carbon-based protective layer surface, is explained with reference to FIG. 3.

FIG. 3 is a schematic diagram showing changes in the contact angle of water on the layer surface, when water is dripped on the surface of the magnetic layer or carbon-based protective layer of a magnetic recording medium. FIG. 3A shows the case in which water is dripped onto the surface of magnetic layer 306, and FIG. 3B shows the case in which water is dripped onto the surface of a thick carbon-based protective layer 308. Further, FIG. 3C shows the case in which water is dripped onto the surface of a thin carbon-based protective layer 308, FIG. 3D shows the case in which water is dripped onto the surface of a carbon-based protective layer 308 which is thin but is highly close-packed, and FIG. 3E shows the case in which water is dripped onto the surface of a carbon-based protective layer 308 which is thin and is loosely packed.

As shown in FIG. 3A, when magnetic layer 306 is not covered by a carbon-based protective layer, oxygen, water, corrosive gases and similar in the atmosphere adhere to the surface of magnetic layer 306 and cause corrosion. When water is dripped onto this corroded magnetic layer 306, the surface of magnetic layer 306 is oxidized through corrosion, so that affinity with water is high, and the contact angle of water on the surface of magnetic layer 306 is extremely small.

Next, magnetic recording media covered with a magnetic layer and a carbon-based protective layer are explained. First, the relation between thickness of the carbon-based protective layer and the contact angle is explained, referring to FIGS. 3B and 3C.

As shown in FIG. 3B, defects 305 generated during film formation exist sporadically in carbon-based protective layer 308. When magnetic layer 306 is covered by a thick (for example, 10 nm) carbon-based protective layer 308, there is little possibility of exposure to the air of magnetic layer 306 due to such defects 305. Consequently, corrosion does not appear on the surface of carbon-based protective layer 308. On the other hand, carbon-based protective layer 308 contains highly hydrophilic carbon. Hence, when water is dripped onto carbon-based protective layer 308, the contact angle becomes extremely large.

On the other hand, as shown in FIG. 3C, when carbon-based protective layer 308 is thin (2 nm or less), magnetic layer 306 is exposed to the air due to defects 305, water and similar in the air adheres to the surface of magnetic layer 308, and corrosion advances via the defect portions from magnetic layer 306 into carbon-based protective layer 308. When water is dripped onto the surface of carbon-based protective layer 308 on which corrosion has appeared, due to the highly hydrophilic properties of the corroded portions, the contact angle is small compared with the case (FIG. 3B) in which carbon-based protective layer 308 is not accompanied by corrosion.

In this way, if carbon-based protective layer 308 is made thin, coverage is reduced, so that the contact angle of water on the surface of carbon-based protective layer 308 becomes small. Thus considering only coverage, which is an element determining corrosion resistance of the magnetic recording medium, the smaller the contact angle, the more the corrosion resistance declines.

Next, an explanation is given of the behavior exhibited by the contact angle when the degree of close-packing of carbon-based protective layer 308 is changed. FIGS. 3D and 3E show the relations between the degree of close-packing of carbon-based protective layer 308 and the contact angle when carbon-based protective layer 308 is thin (2 nm or less).

As shown in FIG. 3D, when carbon-based protective layer 308 is highly close-packed, even when carbon-based protective layer 308 is an extremely thin film 307 due to defects 305, magnetic layer 306 is protected by the close-packed carbon-based protective layer 308. As a result, there is only a small possibility that magnetic layer 306 may be exposed to air. Consequently, compared with a case of coverage by carbon-based protective layer 308 with loosely packed (moderately packed) (FIG. 3C), the contact angle of water is large.

On the other hand, as shown in FIG. 3E, when the degree of close-packing of carbon-based protective layer 308 is low, corrosion of magnetic layer 306 appears on the surface of carbon-based protective layer 308. Because the affinity of the corroded portion for water is high, normally there is a tendency for the contact angle of water on the surface of carbon-based protective layer 308 to be small. However, in actuality the contact angle of water on the surface of carbon-based protective layer 308 is extremely large. This is thought to be because when the degree of close-packing of carbon-based protective layer 308 is low, the hydrophobic properties of carbon-based protective layer 308 are extremely pronounced, and these hydrophobic properties prevail over the hydrophilic properties of the corroded portion.

As explained above, when carbon-based protective layer 308 is a thin layer of 2 nm or less, there is no positive correlation between the degree of close-packing of carbon-based protective layer 308 and the contact angle. Hence, when as a result of a thin carbon-based protective layer 308 of 2 nm or less being highly close-packed, the magnetic recording medium exhibits excellent corrosion resistance, the contact angle of water on the surface of carbon-based protective layer 308 is within a specific range. The inventor discovered that the range of this contact angle is from 25° to less than 60° through the Examples described below.

Below, Examples of magnetic recording media of the invention are explained in still further detail. The following Examples are exemplifications, and are not intended to limit the scope of the invention.

Fabrication of Magnetic Recording Media

Example 1

Magnetic recording media such as that shown in FIG. 1A were fabricated. After polishing a donut-shape glass substrate 102 of diameter 65 mm and thickness 0.635 mm to a surface roughness of approximately 0.1 nm, ultrasonic washing and scrubbing were used to adequately remove abrasives and polishing residue. This was introduced into a sputtering apparatus, and soft magnetic layer 104 and intermediate layer of thickness 60 nm were deposited.

Next, magnetic layer 106 was deposited to a thickness of 20 nm using a CoCrPt—SiO$_2$ target.

Next, an ICP-type plasma CVD method was used to deposit carbon-based protective layer 108. Here the film deposition time was adjusted to deposit carbon-based protective layers 108 of various thicknesses of 2 nm or less onto magnetic layer 106, to obtain 14 different kinds of magnetic recording media 100$a$. Deposition of carbon-based protective layers 108 was performed using C$_2$H$_4$ as the raw material gas at a gas flow rate of 10 sccm to 40 sccm, with an RF discharge output of 1000 W to 2500 W and the bias voltage applied to the substrate varied in the range 0 V to 200 V. A plasma monitor was mounted on the film deposition apparatus to measure the density of the plasma generated under each of the above conditions, as a result of which the plasma density was approximately $1 \times 10^{11}$ cm$^{-3}$ to $8 \times 10^{11}$ cm$^{-3}$.

Next, the thicknesses of carbon-based protective layers 108 and the contact angles of water on the surfaces of carbon-based protective layers 108 were measured for the 14 kinds of magnetic recording media 100$a$ obtained. The thicknesses of carbon-based protective layers 108 were measured using a transmission electron microscope apparatus (manufactured by Hitachi High-Technologies Corp.). Contact angles were measured using a contact angle meter (manufactured by Kyowa Interface Science Co., Ltd.). The measurement results are presented in Table 1.

TABLE 1

| Thickness of carbon-based protective layer (nm) | Contact angle (degrees) |
| --- | --- |
| 0.446 | 27.3 |
| 0.606 | 43.1 |
| 0.856 | 51.4 |
| 1.10 | 36.1 |
| 1.15 | 30.5 |
| 1.23 | 43.4 |
| 1.35 | 56.7 |
| 1.45 | 58.9 |
| 1.54 | 51.1 |
| 1.60 | 36.8 |
| 1.62 | 42.6 |
| 1.66 | 53.1 |
| 1.89 | 53.1 |
| 1.98 | 41.5 |

Comparative Example 1

In fabrication of magnetic recording media 100$a$ of Example 1, only the conditions for deposition of carbon-based protective layer 108 were modified, to fabricate seven kinds of magnetic recording media with contact angles greater than 60° and five kinds with contact angles smaller than 25°.

As the conditions of deposition of carbon-based protective layers 108, the two combinations of gas flow rate and bias voltage of 5 sccm and 0V, and 80 sccm and 300 V, were used, and the two RF discharge outputs of 500 W and 3000 W were used. Upon measuring the plasma density using a plasma monitor, the plasma density was approximately $2 \times 10^{11}$ cm$^{-3}$ to $6 \times 10^{11}$ cm$^{-3}$.

The thickness and water contact angle of the carbon-based protective layers 108 of the 12 kinds of magnetic recording media thus obtained were measured similarly to those of Example 1. The measurement results are shown in Table 2.

TABLE 2

| Thickness of carbon-based protective layer (nm) | Contact angle (degrees) |
|---|---|
| 0.725 | 62.1 |
| 0.810 | 4.00 |
| 0.892 | 70.6 |
| 1.14 | 70.5 |
| 1.33 | 7.16 |
| 1.38 | 68.2 |
| 1.50 | 10.6 |
| 1.52 | 65.4 |
| 1.64 | 63.3 |
| 1.73 | 14.9 |
| 1.90 | 20.6 |
| 1.91 | 62.7 |

Comparative Example 2

In fabrication of magnetic recording media 100*a* of Example 1, only the deposition time of carbon-based protective layer 108 was modified, making adjustments such that the thickness of carbon-based protective layer 108 exceeded 2 nm.

Next, the thickness and water contact angle of carbon-based protective layers 108 of the magnetic recording media thus obtained were measured similarly to those of Example 1. The measurement results are shown in Table 3.

TABLE 3

| Thickness of carbon-based protective layer (nm) | Contact angle (degrees) |
|---|---|
| 2.06 | 66.5 |
| 2.09 | 27.4 |
| 2.14 | 40.5 |
| 2.15 | 62.9 |
| 2.18 | 54.3 |
| 2.20 | 79.7 |
| 2.39 | 58.8 |
| 2.48 | 69.6 |
| 2.56 | 44.1 |
| 2.70 | 75.9 |

Example 2

In fabricating magnetic recording media 100*a* of Example 1, a thermal filament type plasma CVD method was used instead of the ICP-type plasma CVD method to deposit carbon-based protective layer 108. Here the film deposition time was adjusted to deposit carbon-based protective layers 108 of different thicknesses on the magnetic layers 106, to obtain three kinds of magnetic recording media 100*a*. Deposition of carbon-based protective layers 108 was performed using $C_2H_4$ as the raw material gas, at a gas flow rate of 20 sccm and with a bias voltage of 100 V applied to the substrate. Further, a plasma monitor was mounted on the film deposition apparatus to measure the density of the plasma generated under each of the above conditions, as a result of which the plasma density was approximately $3 \times 10^{10}$ cm$^{-3}$ to $8 \times 10^{10}$ cm$^{-3}$.

Next, the thickness and water contact angle of carbon-based protective layers 108 of the three kinds of magnetic recording media thus obtained were measured similarly to those of Example 1. The measurement results are shown in Table 4.

TABLE 4

| Thickness of carbon-based protective layer (nm) | Contact angle (degrees) |
|---|---|
| 1.18 | 30.2 |
| 1.28 | 41.4 |
| 1.73 | 54.2 |

Comparative Example 3

In fabrication of magnetic recording media 100*a* of Example 2, only the conditions for deposition of carbon-based protective layer 108 were modified, to obtain media with carbon-based protective layers of thicknesses exceeding 2 nm, with the contact angle of water with the carbon-based protective layer greater than 60° and with contact angles smaller than 25°. At this time, $C_2H_4$ was used as the raw material gas, the gas flow rate was varied in the range 5 sccm to 80 sccm, and the bias voltage applied to the substrate was varied in the range 0 V to 300 V.

Next, the thickness and water contact angle of carbon-based protective layers 108 of the magnetic recording media thus obtained were measured similarly to those of Example 1. The measurement results are shown in Table 5.

TABLE 5

| Thickness of carbon-based protective layer (nm) | Contact angle (degrees) |
|---|---|
| 0.94 | 6.30 |
| 1.55 | 16.7 |
| 1.88 | 76.6 |
| 2.14 | 19.7 |
| 2.20 | 63.2 |
| 2.28 | 74.6 |
| 2.41 | 69.6 |
| 2.44 | 59.1 |
| 2.46 | 54.7 |
| 2.60 | 26.1 |
| 2.61 | 67.5 |
| 2.67 | 74.2 |
| 2.88 | 60.7 |

Example 3

The ICP plasma source of the film deposition apparatus used in Example 1 was modified, with an ME (Magnetically Enhanced) function added to enable application of a magnetic field in the direction perpendicular to the source. This apparatus was used to deposit carbon-based protective layers 108, and magnetic recording media 100*a* were fabricated similarly to Example 1. In deposition of carbon-based protective layers 108, $C_2H_4$ was used as the raw material gas, the gas flow rate was varied in the range 10 sccm to 40 sccm, the RF discharge output was varied in the range 1000 W to 2500 W, and the bias voltage applied to the substrate was varied in the range 0 V to 200 V. Further, a plasma monitor was mounted on the film deposition apparatus to measure the density of the plasma generated under each of the above conditions, as a result of which the plasma density was approximately $4 \times 10^{12}$ cm$^{-3}$ to $6 \times 10^{12}$ cm$^{-3}$.

Next, the thickness and water contact angle of carbon-based protective layers 108 of magnetic recording media 100a thus obtained were measured similarly to those of Example 1. The measurement results are shown in Table 6.

TABLE 6

Table 6

| Thickness of carbon-based protective layer (nm) | Contact angle (degrees) |
|---|---|
| 0.490 | 25.5 |
| 0.856 | 51.4 |
| 1.15 | 30.5 |
| 1.31 | 50.9 |
| 1.60 | 36.8 |
| 1.66 | 53.1 |
| 1.98 | 41.5 |

Comparative Example 4

In fabrication of magnetic recording media 100a of Example 3, only the conditions for deposition of carbon-based protective layer 108 were modified, to obtain media with carbon-based protective layers of thicknesses exceeding 2 nm, with the contact angle of water with the carbon-based protective layer greater than 60° and with contact angles smaller than 25°. At this time, $C_2H_4$ was used as the raw material gas, the gas flow rate was varied in the range 5 sccm to 80 sccm, the RF discharge output was varied in the range 500 W to 3000 W, and the bias voltage applied to the substrate was varied in the range 0 V to 300 V.

Next, the thickness and water contact angle of carbon-based protective layers 108 of the magnetic recording media thus obtained were measured similarly to those of Example 1. The measurement results are shown in Table 7.

TABLE 7

Table 7

| Thickness of carbon-based protective layer (nm) | Contact angle (degrees) |
|---|---|
| 0.892 | 64.4 |
| 1.14 | 73.7 |
| 1.65 | 76.4 |
| 2.06 | 72.5 |
| 2.11 | 61.2 |
| 2.20 | 76.0 |
| 2.37 | 40.5 |
| 2.39 | 54.1 |
| 2.48 | 69.6 |
| 2.70 | 75.9 |
| 2.79 | 44.1 |
| 2.92 | 78.7 |

Quantities for Evaluation

The corrosion resistance of the magnetic recording media of Examples 1 to 3 and Comparative Examples 1 to 4 was evaluated.

First, 0.8 ml of a 3% by weight nitric acid solution was dripped on the surface of the carbon-based protective layer of a magnetic recording medium, and after leaving for one hour, the nitric acid solution was recovered. Then, this solution was analyzed using an ICP-MS (manufactured by Agilent Technologies), the Co amount per unit area was calculated, and the corrosion resistance of each magnetic recording medium was evaluated.

The passing criterion for corrosion resistance was taken to be a Co amount per unit area in these tests of 5 ng/cm$^2$ or less, which is a level at which no problems arise when the magnetic recording medium is used in a hard disk drive.

Figure 4:
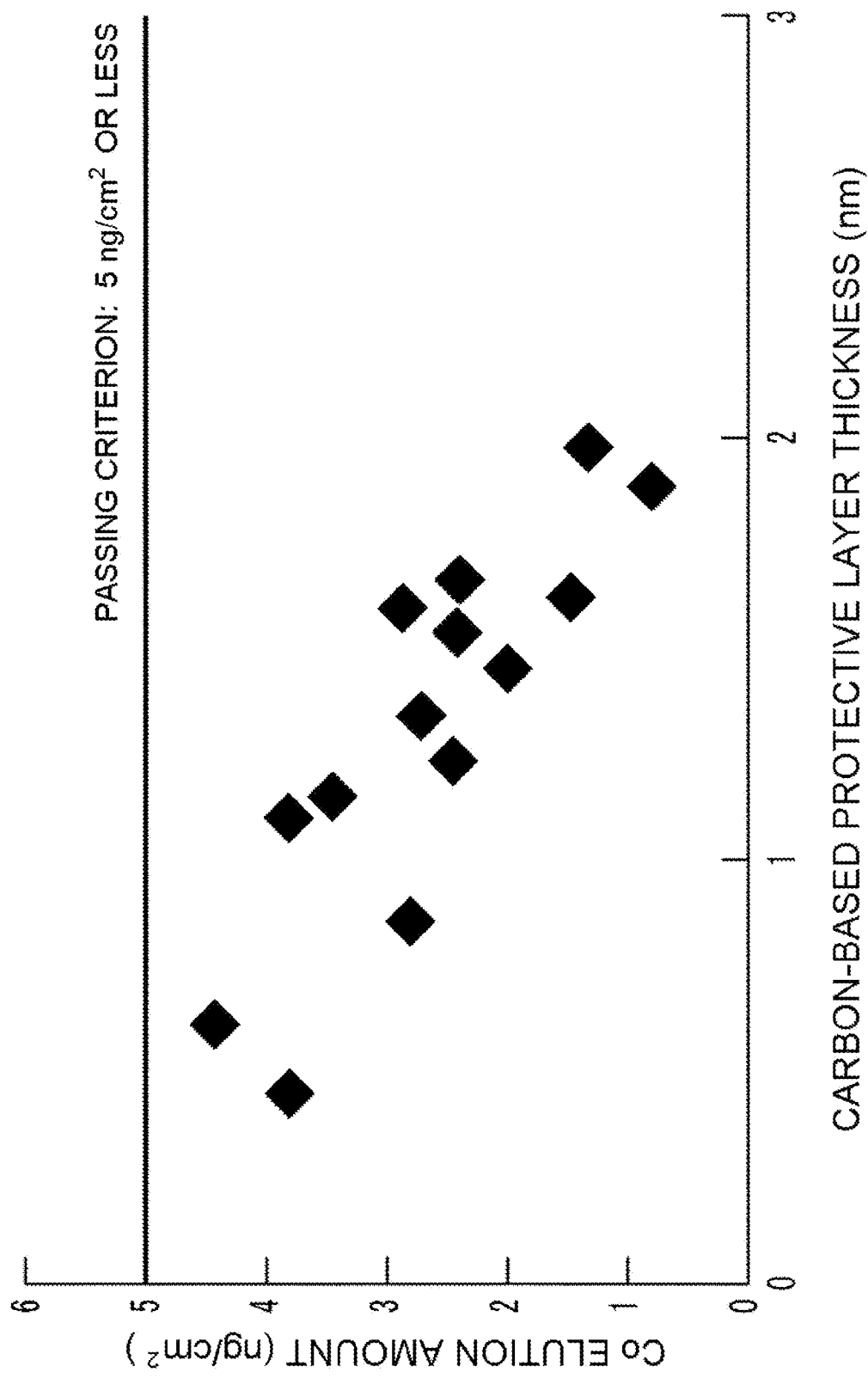
FIG. 4 shows the relation between the thickness of the carbon-based protective layer and the Co elution amount per unit area for various magnetic recording media fabricated in Example 1.

FIG. 4 shows the relation between thickness of the carbon-based protective layer and Co elution amount per unit area for each of the magnetic recording media fabricated in Example 1. In all cases the passing criterion of a Co amount of 5 ng/cm$^2$ or less was satisfied.

On the other hand, none of the magnetic recording media of Comparative Example 1, having a carbon-based protective layer with a water contact angle of greater than 60° or of smaller than 25° satisfied the passing criterion.

Among the magnetic recording media of Comparative Example 2 with carbon-based protective layers of thickness exceeding 2 nm, those with a water contact angle exceeding 60° satisfied the passing criterion, but none of those with a contact angle of 60° or less satisfied the criterion.

Figure 5:
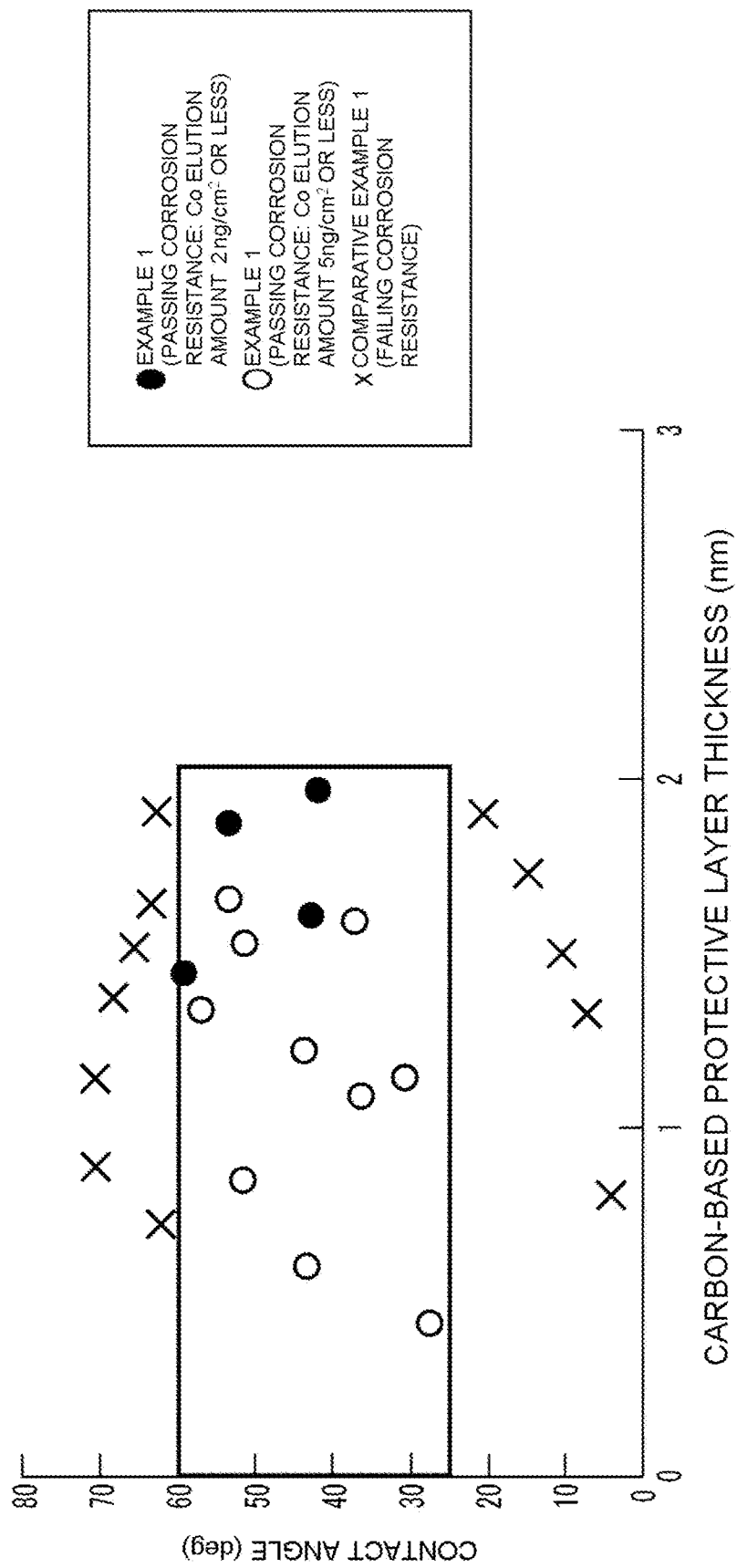
FIG. 5 summarizes the results of corrosion resistance tests for magnetic recording media fabricated in Example 1 and Comparative Example 1.

FIG. 5 summarizes results of corrosion resistance tests for the magnetic recording media fabricated in Example 1 and Comparative Example 1. In FIG. 5, "●" denotes a magnetic recording medium fabricated in Example 1 for which the Co amount was 2 ng/cm$^2$ or lower, "○" denotes a magnetic recording medium fabricated in Example 1 for which the Co amount was 5 ng/cm$^2$ or lower but exceeded 2 ng/cm$^2$, and "x" denotes a magnetic recording medium fabricated in Comparative Example 1.

Figure 6:
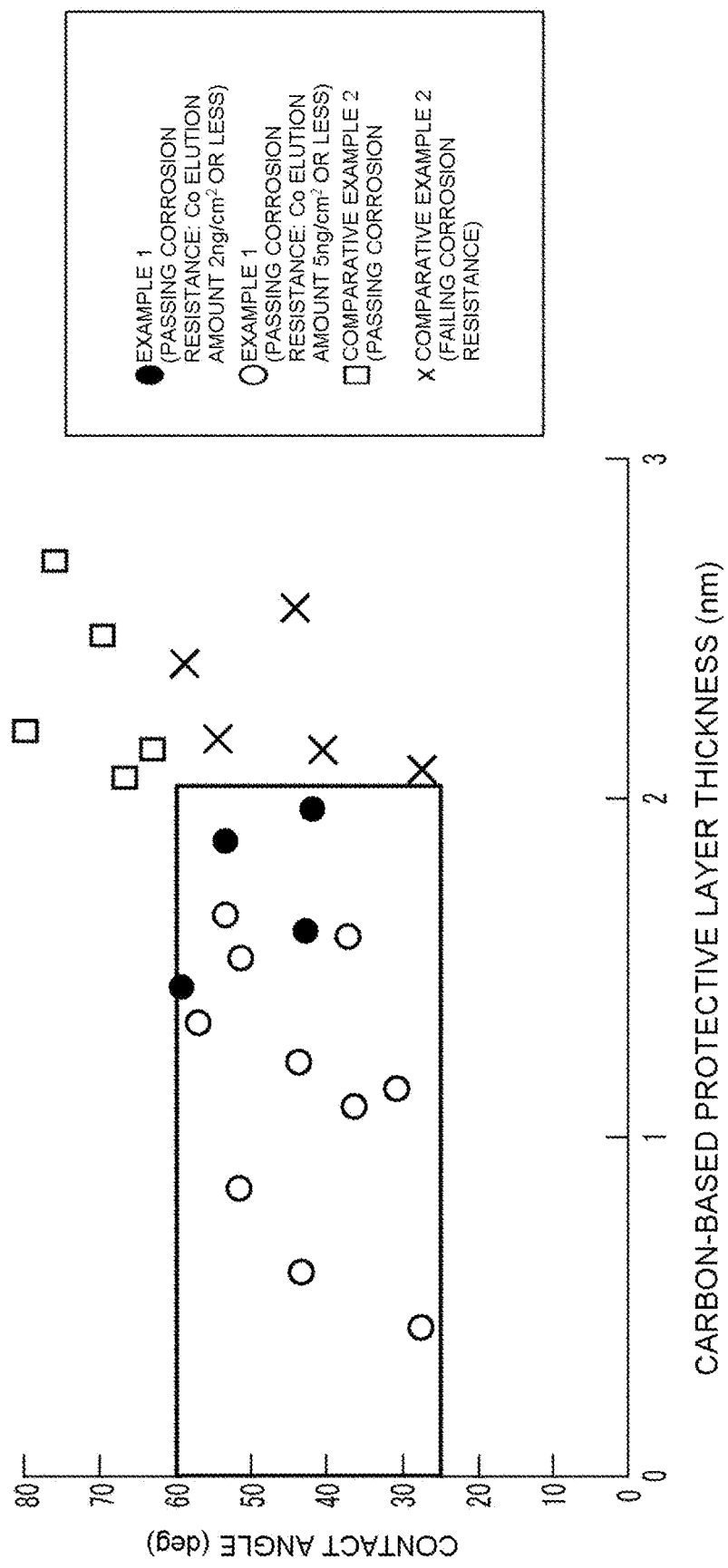
FIG. 6 summarizes the results of corrosion resistance tests for magnetic recording media fabricated in Example 1 and Comparative Example 2.

FIG. 6 summarizes results of corrosion resistance tests for the magnetic recording media fabricated in Example 1 and Comparative Example 2. In FIG. 6, "•" denotes a magnetic recording medium fabricated in Example 1 for which the Co amount was 2 ng/cm$^2$ or lower, "○" denotes a magnetic recording medium fabricated in Example 1 for which the Co amount was 5 ng/cm$^2$ or lower but exceeded 2 ng/cm$^2$, and "□" and "x" denote a magnetic recording medium fabricated in Comparative Example 2. Magnetic recording media denoted by "□" satisfied the passing criterion, but the thickness of the carbon-based protective layer exceeded 2 nm, and the water contact angle exceeded 60°.

Figure 7:
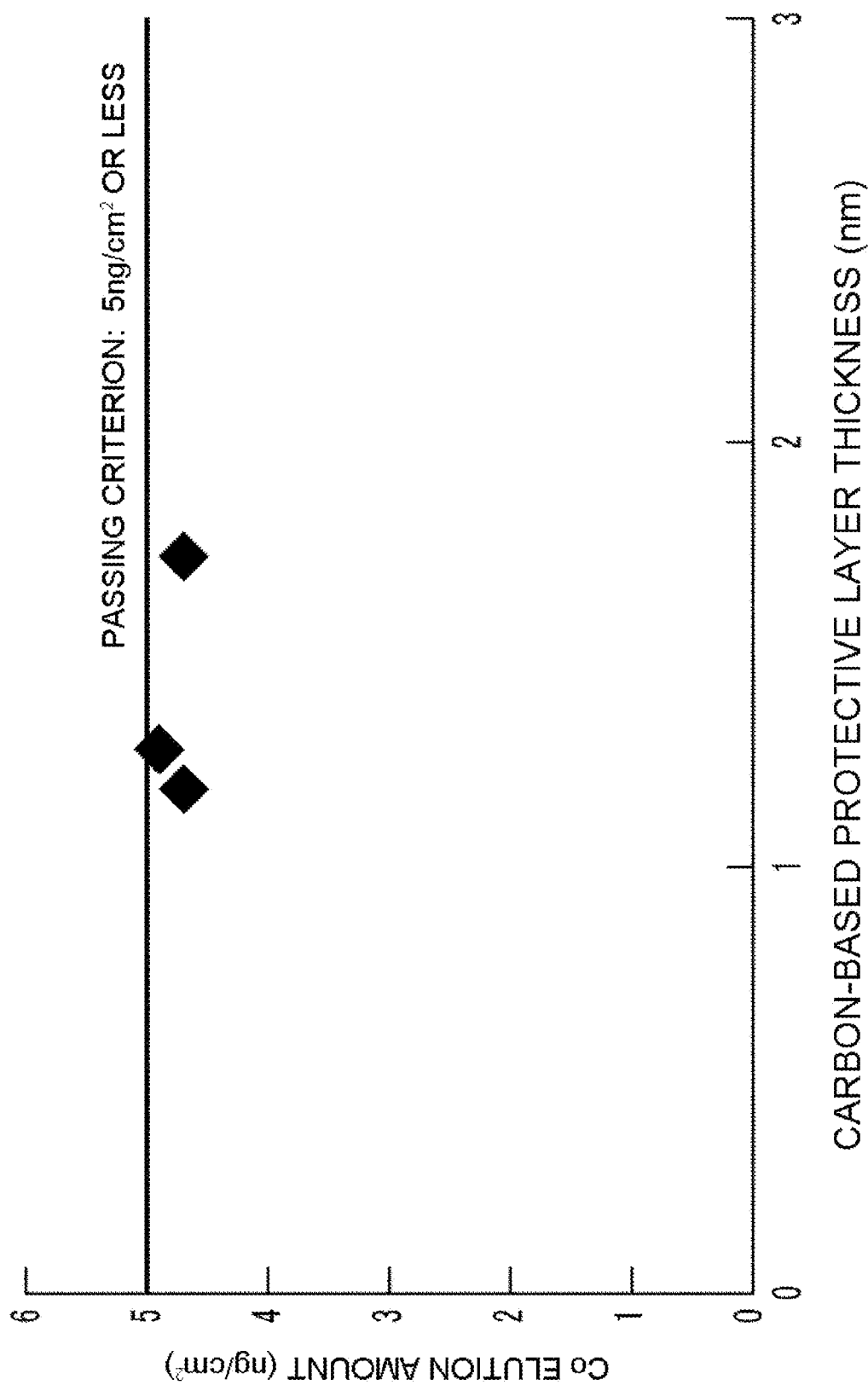
FIG. 7 shows the relation between the thickness of the carbon-based protective layer and the Co elution amount per unit area for various magnetic recording media fabricated in Example 2.

FIG. 7 shows the relation between carbon-based protective layer thickness and Co elution amount per unit area for magnetic recording media fabricated in Example 2. In all cases the passing criterion of a Co amount of 5 ng/cm$^2$ or lower was satisfied.

On the other hand, a number of the magnetic recording media in Comparative Example 3 with a carbon-based protective layer of thickness exceeding 2 nm and with water contact angle exceeding 60° satisfied the passing criterion, but the others did not satisfy the criterion.

Figure 8:
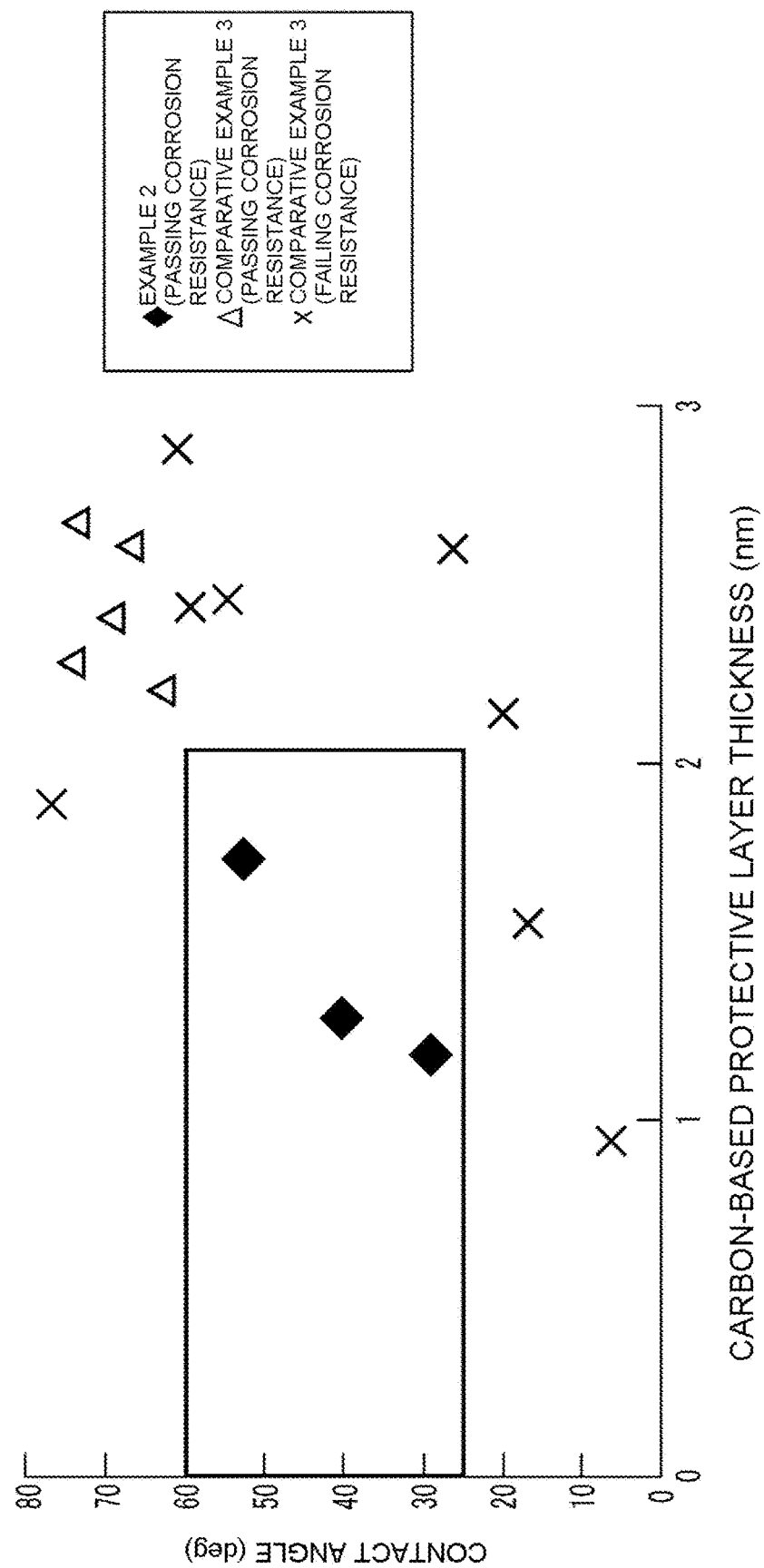
FIG. 8 summarizes the results of corrosion resistance tests for magnetic recording media fabricated in Example 2 and Comparative Example 3.

FIG. 8 summarizes results of corrosion resistance tests for the magnetic recording media fabricated in Example 2 and Comparative Example 3. In FIG. 8, "♦" denotes a magnetic recording medium fabricated in Example 2 for which the Co amount was 5 ng/cm$^2$ or lower, and "Δ" and "x" denote a magnetic recording medium fabricated in Comparative Example 3. Magnetic recording media denoted by "Δ" satisfied the passing criterion, but the thickness of the carbon-based protective layer exceeded 2 nm, and the water contact angle exceeded 60°.

Figure 9:
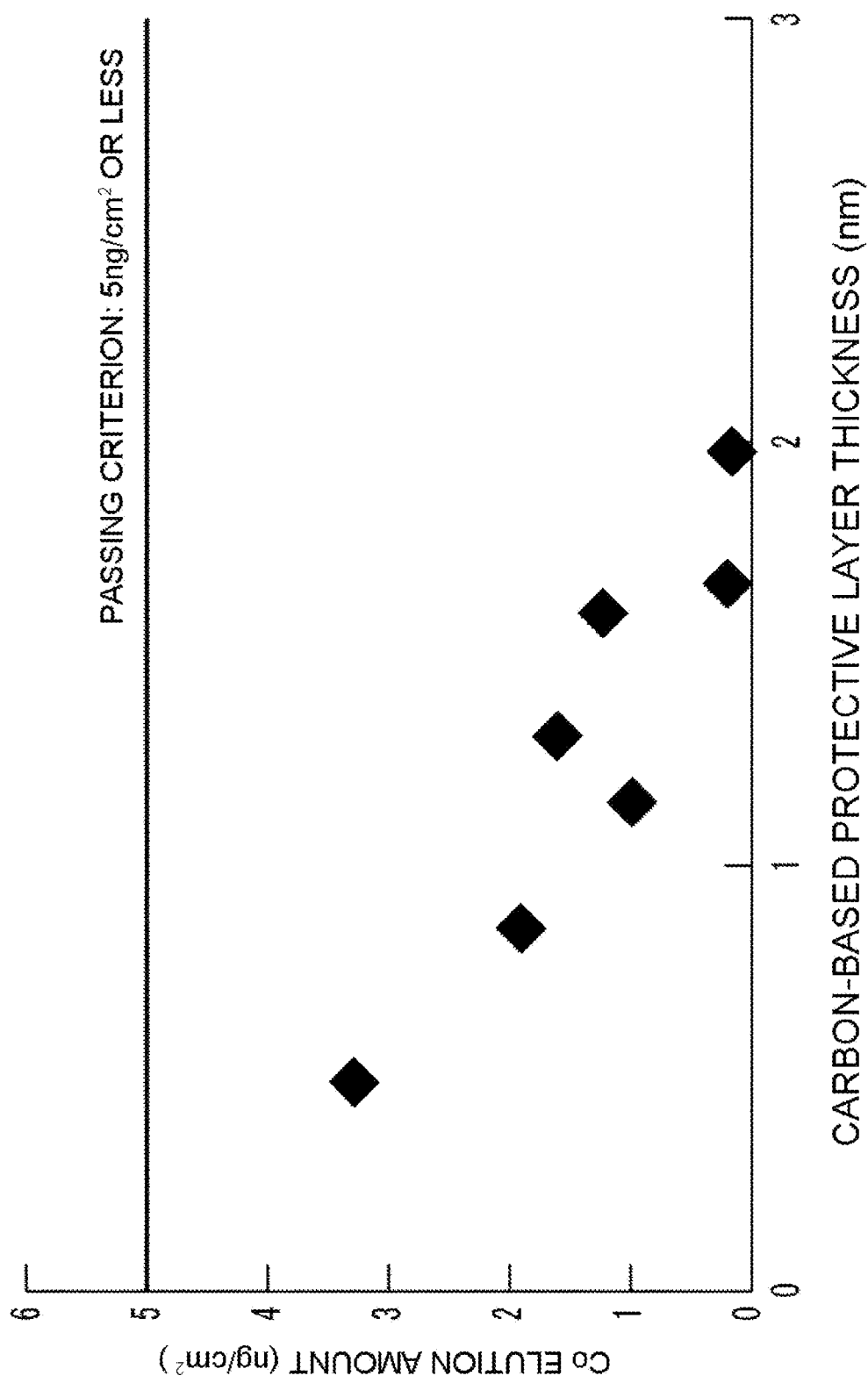
FIG. 9 shows the relation between the thickness of the carbon-based protective layer and the Co elution amount per unit area for various magnetic recording media fabricated in Example 3.

FIG. 9 shows the relation between carbon-based protective layer thickness and Co elution amount per unit area for magnetic recording media fabricated in Example 3. In all cases the passing criterion of a Co amount of 5 ng/cm$^2$ or lower was satisfied.

On the other hand, a number of the magnetic recording media in Comparative Example 4 with a carbon-based protective layer of thickness exceeding 2 nm and with water contact angle exceeding 60° satisfied the passing criterion, but the others did not satisfy the criterion.

Figure 10:
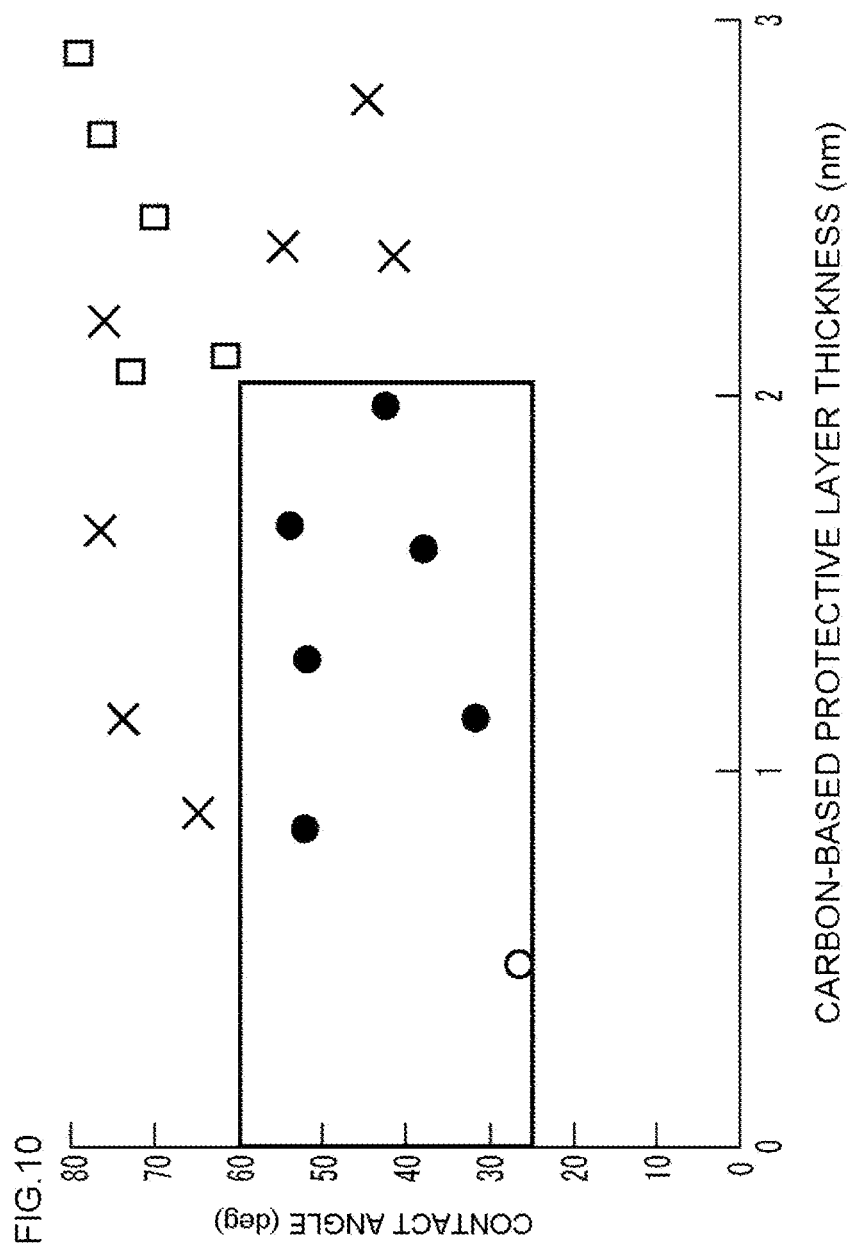
FIG. 10 summarizes the results of corrosion resistance tests for magnetic recording media fabricated in Example 3 and Comparative Example 4.

FIG. 10 summarizes results of corrosion resistance tests for the magnetic recording media fabricated in Example 3 and Comparative Example 4. In FIG. 10, "•" denotes a magnetic recording medium fabricated in Example 3 for which the Co amount was 2 ng/cm$^2$ or lower, and "○" denotes a magnetic recording medium fabricated in Example 3 for which the Co amount was 5 ng/cm$^2$ or lower but exceeded 2 ng/cm$^2$. "□" and "x" denote magnetic recording media fabricated in Comparative Example 4. Magnetic recording media denoted by "□" satisfied the passing criterion, but the thickness of the carbon-based protective layer exceeded 2 nm, and the water contact angle exceeded 60°.

As exampled above, magnetic recording media having a carbon-based protective layer of thickness 2 nm or less, and moreover with a contact angle of water on the surface of the carbon-based protective layer of 25° or greater and less than 60°, all satisfied the passing criterion for corrosion resistance.

Further, magnetic recording media in which the carbon-based protective layer was formed by an ICP-type plasma CVD method (Example 1) yielded more satisfactory results for corrosion resistance than did magnetic recording media using a thermal filament-type plasma CVD method (Example 2). This is attributed to the fact that the plasma density used in the ICP method is an order of magnitude higher than that for the thermal filament method, so that the degree of close-packing of the carbon-based protective layer was increased.

Thus, a magnetic recording medium has been described according to the present invention. Many modifications and variations may be made to the techniques and structures described and illustrated herein without departing from the spirit and scope of the invention. Accordingly, it should be understood that the methods and media described herein are illustrative only and are not limiting upon the scope of the invention.

EXPLANATION OF REFERENCE NUMERALS

100, 100a, 100b Magnetic recording medium
102 Substrate
106, 306 Magnetic layer
108, 308 Carbon-based protective layer

What is claimed is:

1. A magnetic recording medium comprising:
    a substrate,
    a magnetic layer on the substrate, and
    a carbon-based protective layer on the magnetic layer,
    wherein a thickness of the carbon-based protective layer is 2 nm or less, and a contact angle of water on a surface of the carbon-based protective layer is 25.5° or greater and less than 60°, and the carbon-based protective layer is formed by a plasma CVD method.

2. The magnetic recording medium according to claim 1, wherein the carbon-based protective layer contains diamond-like carbon.

3. The magnetic recording medium according to claim 1, wherein, in the plasma CVD method, the plasma density is $10^{10}$ cm$^{-3}$ or higher.

4. The magnetic recording medium according to claim 1, wherein the magnetic recording medium is a perpendicular magnetic recording-type magnetic recording medium.

5. A method of manufacturing a magnetic recording medium, comprising:
    forming a magnetic layer on a substrate, and
    forming a carbon-based protective layer on the magnetic layer, said layer comprising diamond-like carbon and being formed by CVD using a hydrocarbon gas,
    wherein a thickness of the carbon-based protective layer is 2 nm or less, and a contact angle of water on a surface of the carbon-based protective layer is 25.5° or greater and less than 60°, wherein the CVD is a plasma CVD.

6. A method according to claim 5, wherein the gas flow rate is between 10 sccm and 40 sccm.

7. A method according to claim 5, wherein the carbon ion energy is between 15 eV and 150 eV.

8. A method according to claim 5, wherein the plasma CVD is a capacitively coupled plasma method with a plasma density of approximately $10^{11}$ cm$^{-3}$.

9. A method according to claim 5, wherein the plasma CVD is a thermal filament method, with a plasma density of approximately $10^{10}$ cm$^{-3}$ to $10^{11}$ cm$^{-3}$.

10. A method according to claim 5, wherein the CVD is an electron cyclotron resonance method or inductively coupled plasma method, with a plasma density of approximately $10^{11}$ cm$^{-3}$ to $10^{12}$ cm$^{-3}$.

11. A method according to claim 5, wherein the plasma CVD is a magnetically enhanced inductively coupled plasma method, with a plasma density of approximately $10^{12}$ cm$^{-3}$ or higher.

* * * * *